(12) United States Patent
Javeed

(10) Patent No.: US 12,153,544 B2
(45) Date of Patent: Nov. 26, 2024

(54) TEMPORAL DIFFERENCE LEARNING, REINFORCEMENT LEARNING APPROACH TO DETERMINE OPTIMAL NUMBER OF THREADS TO USE FOR FILE COPYING

(71) Applicant: MICRO FOCUS SOFTWARE INC., Provo, UT (US)

(72) Inventor: Arshad Javeed, Bangalore (IN)

(73) Assignee: Micro Focus Software Inc., Provo, UT (US)

( * ) Notice: Subject to any disclaimer, the term of this patent is extended or adjusted under 35 U.S.C. 154(b) by 921 days.

(21) Appl. No.: 16/837,209

(22) Filed: Apr. 1, 2020

(65) Prior Publication Data

US 2020/0320035 A1    Oct. 8, 2020

(51) Int. Cl.
*G06F 16/11*       (2019.01)
*G06F 9/48*        (2006.01)
*G06N 20/00*      (2019.01)

(52) U.S. Cl.
CPC .......... *G06F 16/119* (2019.01); *G06F 9/4843* (2013.01); *G06N 20/00* (2019.01)

(58) Field of Classification Search
CPC ...... G06F 16/119; G06F 9/4843; G06F 16/11; G06F 9/543; G06F 16/184; G06N 20/00; G06N 3/006
See application file for complete search history.

(56) References Cited

U.S. PATENT DOCUMENTS

| | | | |
|---|---|---|---|
| 7,047,309 B2 | 5/2006 | Baumann | |
| 7,313,576 B2 | 12/2007 | Clark | |
| 8,547,996 B2 | 10/2013 | Deutesfeld | |
| 9,092,146 B2 | 7/2015 | Jayaraman | |
| 10,691,700 B1 * | 6/2020 | Agrawal | G06F 16/2282 |
| 2005/0119988 A1 * | 6/2005 | Buch | G06F 9/5027 |

(Continued)

FOREIGN PATENT DOCUMENTS

| CN | 104899079 A | * | 9/2015 |
|---|---|---|---|
| CN | 105260166 A | * | 1/2016 |

(Continued)

OTHER PUBLICATIONS

Zhao et al., CN105260166A Description Translation, Jan. 20, 2016, [database online], [retrieved on Jan. 13, 2023] Retrieved from Espacenet using Internet <URL:https://worldwide.espacenet.com/publication Details/description?CC=CN&NR=105260166A&KC=A&FT=D&ND=3&date=20160120&DB=&locale=en_EP>, pp. 1-25 (Year: 2016).*

(Continued)

*Primary Examiner* — Meng Al T An
*Assistant Examiner* — Hsing Chun Lin
(74) *Attorney, Agent, or Firm* — Sheridan Ross P.C.

(57) ABSTRACT

For a given file type, an optimal number of threads to use to copy files of each of a number of different discrete file sizes is determined, using a temporal difference learning, reinforcement learning approach in which file copy time is used as feedback reward reinforcement. A continuous function corresponding to the given file type and outputting the number of threads to use to copy files having this given file type and that are of any input file size is fitted onto the optimal numbers of threads determined for the discrete file sizes.

20 Claims, 9 Drawing Sheets

(56) References Cited

U.S. PATENT DOCUMENTS

| | | | | |
|---|---|---|---|---|
| 2011/0161294 | A1* | 6/2011 | Vengerov | G06F 16/275 |
| | | | | 707/E17.046 |
| 2015/0302016 | A1* | 10/2015 | Nam | G06F 16/119 |
| | | | | 707/609 |
| 2017/0012906 | A1* | 1/2017 | Szilagyi | H04B 1/0483 |
| 2019/0042331 | A1* | 2/2019 | McDonnell | G06F 1/3206 |
| 2019/0184564 | A1* | 6/2019 | Muraoka | B25J 9/1633 |
| 2020/0097198 | A1* | 3/2020 | Bansal | G06F 3/0604 |
| 2020/0125474 | A1* | 4/2020 | Salunke | G06F 11/3452 |

FOREIGN PATENT DOCUMENTS

| | | | |
|---|---|---|---|
| CN | 108121601 A | * | 6/2018 |
| CN | 109445970 A | * | 3/2019 |

OTHER PUBLICATIONS

Wang et al. CN109445970A Description Translation, Mar. 8, 2019, [database online], [retrieved on Jan. 13, 2023] Retrieved from Espacenet using Internet <URL:https://worldwide.espacenet.com/publication Details/description?CC=CN&NR=109445970A&KC=A&FT=D&ND=3&date=20190308&DB=&locale=en_EP>, pp. 1-22 (Year: 2019).*

Ma et al. Ananke: A Q-Learning-Based Portfolio Scheduler for Complex Industrial Workflows, Aug. 10, 2017, [retrieved on Jan. 13, 2023], <URL:https://ieeexplore.ieee.org/document/8005354>, pp. 227-232 (Year: 2017).*

Peng et al. CN108121601A Description Translation, Jun. 5, 2018, [database online], [retrieved on Jan. 13, 2023] Retrieved from Espacenet using Internet <URL:https://worldwide.espacenet.com/patent/search/family/062228453/publication/CN108121601A?q=CN%20108121601%20A>, pp. 1-23 (Year: 2018).*

Li et al. CN104899079A Description Translation, Sep. 9, 2015, [database online], [retrieved on Sep. 10, 2023] Retrieved from Espacenet using Internet <URL:https://worldwide.espacenet.com/publication Details/description?CC=CN&NR=104899079A&KC=A&FT=D&ND=3&date=20150909&DB=&locale=en_EP>, pp. 1-16 (Year: 2015).*

Claeys et al. Design and optimisation of a (FA)Q-learning-based HTTPadaptive streaming client, Mar. 13, 2014, <URL:https://www.tandfonline.com/doi/epdf/10.1080/09540091.2014.885273?needAccess=true&role=button>, pp. 25-43 (Year: 2014).*

Wang et al; AMC Digital Library; Efficient SSD Caching by Avoiding Unnecessary Writes Using Machine Learning; Published by Association for Computing Machinery; Copyright 2018;1 page.

Liu, et al; Toward a Smart Data Transfer Node; Published in the Future Generation Computer Systems; Argonne National Laboratory; Dept. of Computer Science; University of Chicago; 2018; 12 pages.

Telstra; Self-Optimising Networks Enable AI/ML Data Transfers; www.telstraglobal.com/uk/insights/blogs/blog/self-optimising-networks-enable-ai-ml-data-transfers; Copyright Telstra 2018; Mar. 13, 2018; 2 pgs.

* cited by examiner

FIG 3

| THREADS | CV FOR MAINTAIN THREAD COUNT ACTION | CV FOR INCREMENT THREAD COUNT ACTION | CV FOR DECREMENT THREAD COUNT ACTION |
|---|---|---|---|
| 1 | CV | CV | N/A |
| 2 | CV | CV | CV |
| ⋮ | | | |
| 7 | CV | CV | CV |
| 8 | CV | CV | CV |
| 9 | CV | CV | CV |
| 10 | CV | CV | CV |
| ⋮ | | | |
| N | CV | N/A | CV |

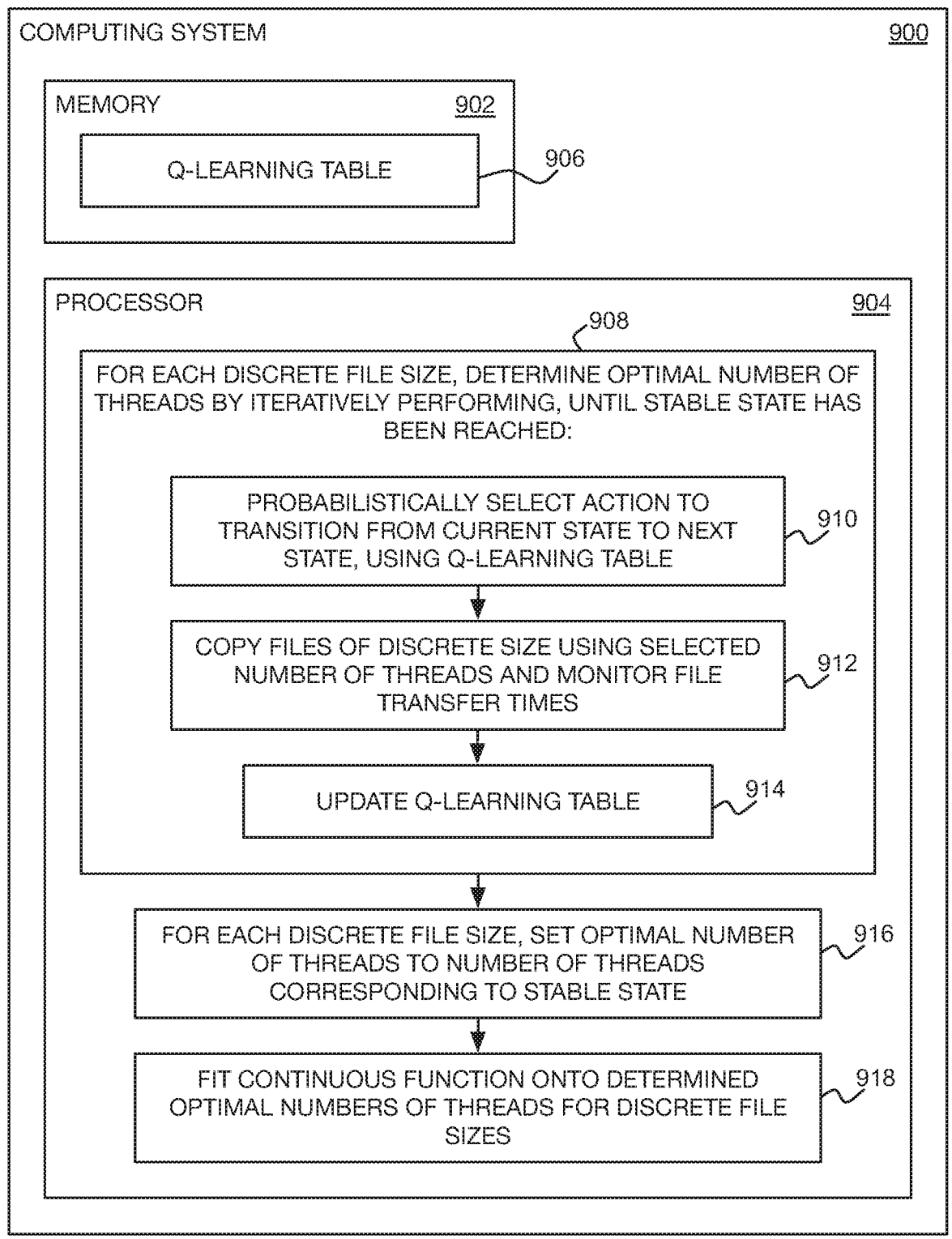

TEMPORAL DIFFERENCE LEARNING, REINFORCEMENT LEARNING APPROACH TO DETERMINE OPTIMAL NUMBER OF THREADS TO USE FOR FILE COPYING

BACKGROUND

File copying can be considered as the creation of a new file that has the same content as an existing file. Computer operating systems include file-copying commands that users can employ. Operating systems having graphical user interfaces (GUIs) can provide for file copying via copy-and-paste or drag-and-drop techniques, and operating systems may provide command-line interfaces (CLIs) in which commands like "cp" or "copy" can be used. Operating systems may expose application-programming interfaces (APIs) to perform local file copying, and which can be used by application programs running on the operating systems.

BRIEF DESCRIPTION OF THE DRAWINGS

FIG. 3 is a diagram of an example Q-learning table that can be used in a Q-learning approach, as one type of temporal difference learning, reinforcement learning approach, to determine the optimal number of threads to copy files of a discrete file size.

FIG. 9 is a diagram of an example system.

DETAILED DESCRIPTION

Figure 1:
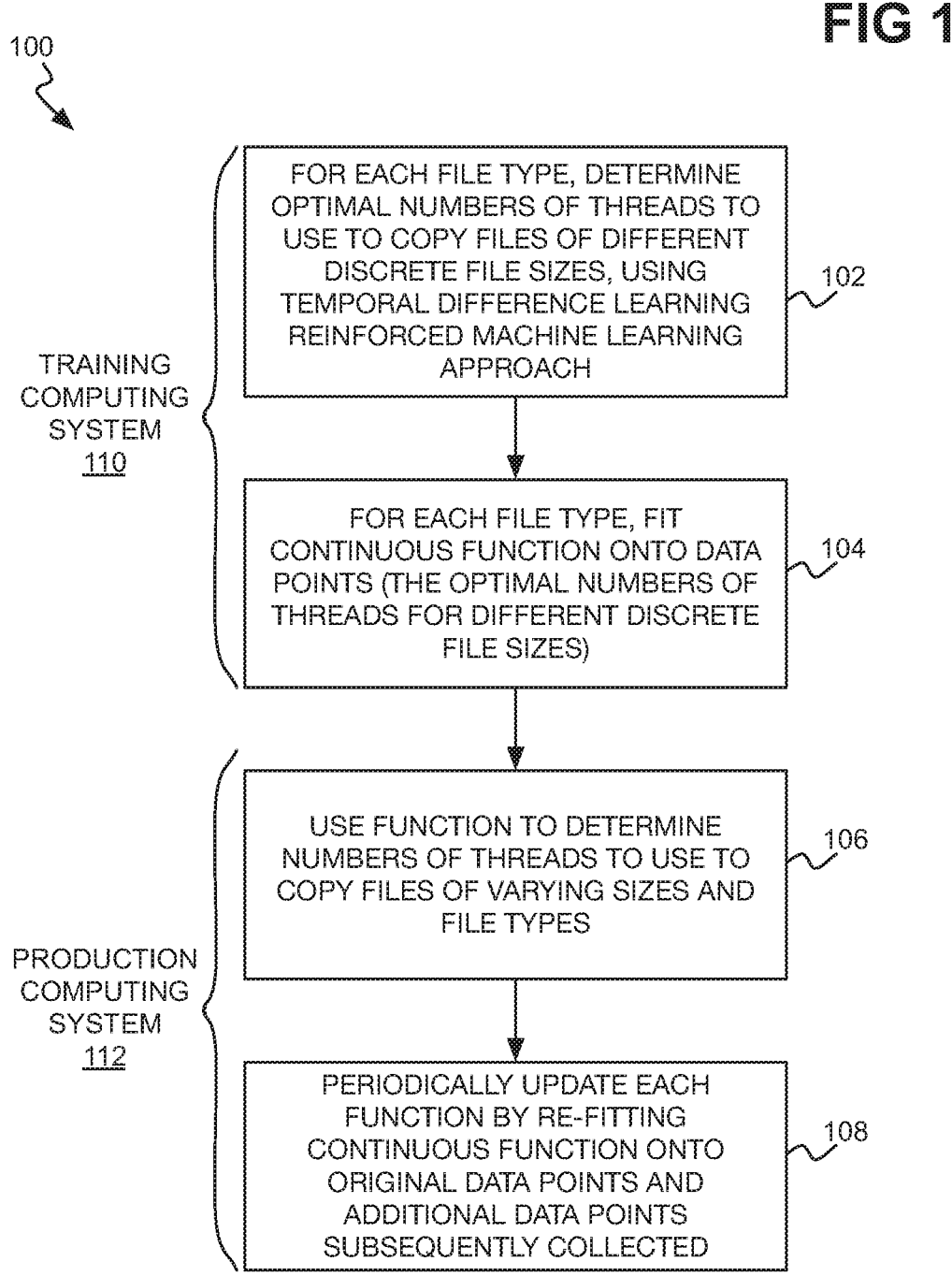
FIG. 1 is a flowchart of an example method for using a temporal difference learning, machine learning approach to determine the optimal number of threads to use to copy files.

As noted in the background, operating systems permit users and application programs to copy files using commands exposed at command-line interfaces (CLIs), using graphical user interface (GUI) techniques, and/or using exposed application-programming interfaces (APIs). A user or a computer program, for instance, may copy a file from one logical directory or folder of a storage device of a computing device, like a hard disk drive, to the same or different directory or folder on the same or different storage device connected the device. After file copying is performed, there are thus (at least) two instances of the file: the original file that was copied, and the copy of the original file that was created by the file copying operation.

Modern operating systems running on modern computing systems can spawn multiple threads of a process. A process may be considered as an instance of program code that is being executed. A thread is a sequence of programmed instructions, and may be considered as a component of a process. On a computing system having multiple single- or multiple-core processors, or which has a single multiple-core processor, the threads of a process may execute concurrently on the various processing cores, sharing resources such as memory, to complete the process.

An operating system can have a parameter denoting the number of threads that a corresponding process will spawn when copying multiple files. While adjustable, this default thread count is infrequently modified by the end user, or by different computer programs that leverage the operating system's built-in file copying functionality. In general, this is because it is difficult to surmise the optimal number of threads for copying a given set of files, where the optimal number of threads may be considered as the number of threads a process should use to copy the files in the shortest amount of time.

A complicating factor, for instance, is that the optimal number of threads depends on a variety of different parameters, including the size and type (e.g., file format or a group of file formats) of the files to be copied. Other parameters include characteristics of the underlying computing system, such as storage device performance, processor speed, the number of threads the operating system can support, the speed at which processes are executable within the system, and so on. Furthermore, while increasing the number of threads may at first decrease file copy time, setting the number of threads too high may in actuality increase file copy time.

Techniques described herein employ machine learning to determine the optimal number of threads to use to copy files. Specifically, a temporal difference learning, reinforcement learning approach, in which file copy time serves as feedback reward reinforcement, is used to determine the optimal number of threads for copying files of each of a number of different discrete file sizes and of a particular file type. A continuous function can then be fit onto the determined optimal numbers of threads for the different discrete file sizes for this particular file type. This process is repeated for each of a number of different file types, such as different file formats or different groups of file formats. Thus, when copying a set of files having a given file size and of the same particular file type, the number of threads output by the continuous function for the particular file type can be employed.

FIG. 1 shows an example method 100 for using a temporal difference learning, machine learning approach to determine the optimal number of threads to use to copy file. A training computing system 110 may perform parts 102 and 104 of the method 100, whereas a different, production computing system 112 may perform parts 106 and 108. In other implementations, the same computing system may perform the method 100 in its entirety.

The training computing system 110 determines, for each of a number of different file types, optimal numbers of threads to use to copy files of different discrete file sizes, using a temporal difference learning, reinforcement learning approach (102). That is, for a particular file type, each of a number of preselected file sizes, the optimal number of threads to use to copy files of the particular file type and having the discrete file size in question is determined. For example, the file sizes may range from 512 bytes to several thousand bytes, in varying increments. For the particular file type, test files of each file size may be generated, or existing files of the discrete file sizes may be employed. The files of a given discrete file size may be different files of the same size, or may be copies of the same file.

This process is then repeated for each particular file type. For example, the file types may be different file formats, such as executable files (e.g., files having names ending in ".exe"), image files of various formats (such as PEG files having names ending in ".jpeg" or ".jpg," PNG files having names ending in ".png," and so on), as well as other file formats. As another example, a file type may correspond to a group of file formats that are similar to one another. For instance, a file type may correspond to the tar, zip, mp4, and avi file formats in one implementation.

The files are of discrete file sizes in that optimal numbers of threads are not determined for files of all possible file sizes, which in any case is tractably difficult if not impossible. The greater the number of different discrete file sizes selected in part 102, however, the more likely that the method 100 can determine the optimal number of threads to copy files of any file size. Furthermore, the discrete file sizes are desirably selected so that they span across a range of sizes of files that are likely to be subsequently copied by users and application programs. The discrete file sizes may continue to be selected until the optimal thread count for copying files of a selected discrete file size is one for a particular.

How the optimal number of threads is determined for each particular file type to copy files of each discrete file size and of this file type is described later in the detailed description. However, the training computing system 110 performs part 102 using a reinforcement learning approach. Reinforcement learning is a type of machine learning relating to how software agents take actions in an environment to maximize a cumulative reward, and differs from other machine learning techniques, like supervising learning and unsupervised learning. In the context of part 102, the processes performing the copying can be considered as the software agents, and the environment is the training computing system 110 in which the copying is performed. The cumulative reward used in part 102 is based on the file copy time to copy a file, as feedback reward reinforcement.

More specifically, the training computing system 110 performs part 102 using a temporal difference learning approach. Temporal difference learning is a type of reinforcement learning approach that does not use a model. Rather, learning occurs by bootstrapping from the current estimate of a value function. In temporal difference learning, predictions as to maximizing the value function are adjusted to match later, more accurate, predictions before a final outcome is known.

More specifically still, the training computing system 110 can perform part 102 using a Q-learning approach. Q-learning is a specific type of temporal difference learning, and thus is also model-free. The goal of Q-learning is for an agent to learn a policy, which instructs the agent what action to take under what circumstances. Q-learning finds a policy that is optimal in that an expected value of the total reward is maximized over all steps, or actions, from the current state. As noted above, how part 102 can be performed to determine the optimal number of threads for copying files of a given discrete file size using a temporal difference learning, reinforcement learning approach, like Q-learning, is described later in the detailed description.

The result of part 102 is, for each file type, a set of data points, which are the optimal numbers of threads to use to copy files of this file type and having various discrete file sizes. That is, each data point corresponds to a particular discrete file size and particular file type, and is the optimal number of threads for copying files of the particular file type and having the discrete file size in question. The data points determined part 102 can be considered the original data points, as opposed to subsequently added data points to the set of data points.

The training computing system 110 can, for each file type, fit a continuous function onto the set of data points for the file type (104). The continuous function for each file type may be a polynomial function, for instance. The function for a particular file type, for a given file size of files of the particular file type to be copied, outputs the number of threads to use to copy the files. Therefore, whereas part 102 determines the optimal numbers of threads to use to copy files of each particular file type and having particular discrete file sizes, part 104 effectively permits this set of determined optimal numbers of threads for each file type to be used to determine the optimal number of threads for any file size.

The continuous functions determined in part 104 can be provided to the production computing system 112. The production computing system 112 can then use these functions to determine the numbers of threads to use to copy files of varying file sizes and types (106). For instance, when a production computing system 112 is to copy files having the same file type and of a particular size, the particular size is input into the function corresponding to the file type of the files. The output of the function is the number of threads that the production computing system 112 should use to copy the files. Each function may provide a non-integer real number, in which case the function output may be rounded or truncated to determine the number of threads to use to copy the files.

The production computing system 112 can differ from the training computing system 110 in constituent components if not in actual workload. The continuous functions may accurately provide the optimal number of threads to use to copy files of differing files sizes on the training computing system 110, at the time the optimal numbers of threads were determined for the discrete file sizes in part 102. However, the functions may not be as accurate over time or on the production computing system 112.

Therefore, periodically, the continuous functions may be updated at the production computing system 112 so that the functions more accurately predicts the optimal numbers of threads to use to copy files of different file sizes at the system 112 itself (108). As described in more detail later in the detailed description, each continuous function may be re-fitted onto an updated set of data points. The updated set of data points can include the original data points determined for the function in question at the training computing system 110 in part 102, as well as additional data points subsequently collected at the production computing system 112.

For instance, periodically when a set of files is to be copied at the production computing system 112, a number of threads different than that which the function corresponding to the file type of the files prescribes may be used to copy the files. If the result is less variance in storage device utilization, then this number of threads is added for the file size of the file in question as a new data point to the set of data points corresponding to the file type. When a sufficient number of data points have been newly added to the set of data points corresponding to the file type, the continuous function for this file type may then be re-fitted onto the updated data points set to tune the function to the production computing system 112.

Figure 2:
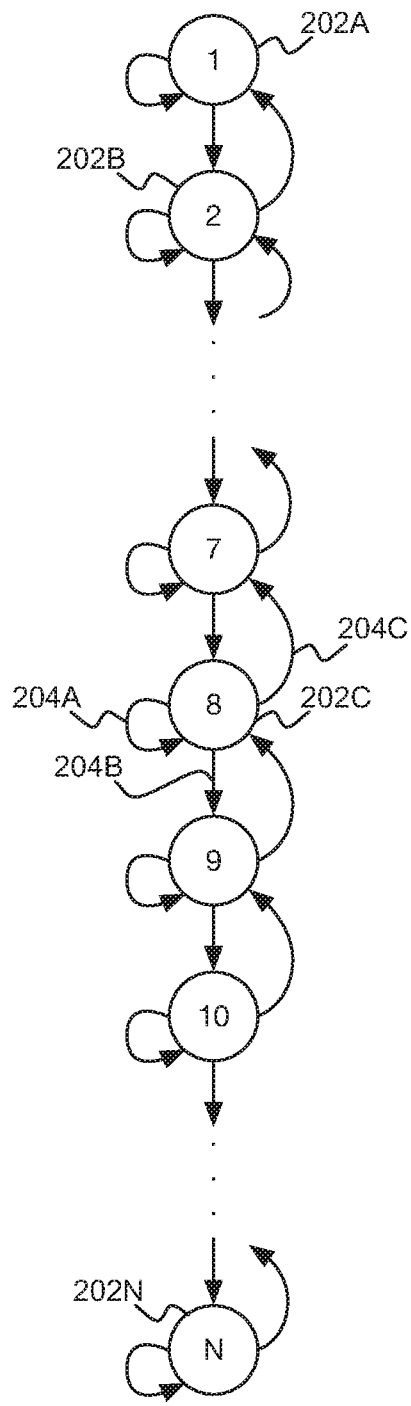
FIG. 2 is a diagram of example states and example actions used in the temporal difference learning, reinforcement learning approach of FIG. 1 to determine an optimal number of threads to copy files of a particular file type and having a particular discrete file size.

FIG. 2 shows example states and example actions used in a temporal difference learning, reinforcement learning approach to determine an optimal number of threads to copy files having the same file type and of a discrete file size. A software agent, such as the process that an operating system spawns to copy files of a particular file type and of a particular file size, transitions among different states by performing actions over multiple iterations of copying the file, until a stable state has been reached. There are states 202A, 202B, 2020, . . . , 202N, collectively referred to as the states 202. The states 202 correspond to numbers of threads that can be used to copy the set of files.

The number of states 202 can be equal to the maximum number of threads that an operating system supports in copying files. For example, in some types of operating systems, between one and 128 threads can be used to copy files. Therefore, there are 128 states. The state 202A corresponds to one thread, the state 202B corresponds to two threads, and so on, through state 202N, which corresponds to N=128 threads.

Between each iteration of copying files of a particular file type and of a particular discrete file size, the software agent (e.g., an operating system-spawned process) transitions from a current state 202 to a next state 202 by performing an action. The current state 202 corresponds to the number of threads most recently used to copy files of a particular type and having a particular discrete file size, in the current iteration. The next state 202 corresponds to the number of threads to be used to copy files of this file type and having the particular discrete file size in the next iteration.

One of three different actions can be performed from every state 202 (except the first state 202A and the last state 202N) to transition to another state 202. Using the state 202C corresponding to eight threads as an example, there are three actions 204A, 204B, and 204C, collectively referred to as the actions 204, to transition to a next state 202. The action 204A corresponds to maintaining the current number of threads; as such, the next state 202C is the same as the current state 202C. The action 204B corresponds to incrementing the current number of threads by one; as such, the next state 202 corresponds to nine threads. The action 204C corresponds to decrementing the current number of threads by one; as such, the next state 202 corresponds to seven threads.

The number of threads cannot be decremented below using one thread to copy the files. Therefore, the first state 202A can perform one of just two actions to transition to a next state 202: maintain the current number of threads, such that the next state 202 remains the state 202A; or increment the current number of threads, such that the next state 202 is the state 202 correspond to two threads. Similarly, the number of threads cannot be incremented above using more threads than the maximum number that the operating system in question supports. Therefore, the last state 202N can similarly perform one of just two actions to transition to a next state 202: maintain the current number of threads, such that the next state remains the state 202N, or decrement the current number of threads, such that the next state 202 is the state 202 corresponding to N-1 threads.

FIG. 3 shows an example Q-learning table 300 that can be used in a Q-learning approach to determine the optimal number of threads to copy files of a particular file type and of a discrete file size. The Q-learning table 300 is used to probabilistically select the action 204 to transition from the current state 202 to the next state 202 in the next training iteration in copying files of each discrete file size for the particular file type. After each training iteration, the Q-learning table 300 is then updated. There is a Q-learning table 300 for each discrete file size and for each particular file type. It is noted that the Q-learning table 300 is a temporary table that is created and used during the training process for each file type and for each file size, and once stable state is identified for combination of file type and discrete file size, it can be deleted.

The Q-learning table 300 stores cumulative values (CVs), or cumulative rewards, for state-action pairs. The cumulative value for each pair of a particular state 202 and a particular action 204 is the expected cumulative reward for taking the action 204 in transitioning from the particular state 202 to another state 202. Since there are three actions 204 that can be taken from each state 202 (other than the first state 202A and the last state 202N) to another state 202, there are thus three state-action pairs for each state 202 other than the first and last states 202A and 202N. There are two state-action pairs for each of the first and last states 202A and 202N.

The Q-learning table 300 therefore includes rows 302A, 302B, 302C, . . . , 302N, collectively referred to as the rows 302, and which correspond to the states 202. The number of rows 302 of the table 300 is equal to the number of states 202, which is equal to the number of different threads that an operating system process can deploy to copy the set of files (of a particular file type and having a particular discrete file size). The Q-learning table 300 includes four columns 304A, 304B, 304C, and 304D, collectively referred to as the columns 304, for each row 302. The column 304D indicates the number of threads to which a given row 302, and thus a given state 202, corresponds. The columns 304A, 304B, and 304C, by comparison, store the cumulative value for transitioning from the state 202 of a given row 302 to a next state by respectively performing the actions 204A, 204B, and 204C.

Specifically, the column 304A thus stores the cumulative value for transitioning from the state 202 of a given row 302 to a next state by maintaining the number of threads (such that the next state 202 is the same as the current state 202). The column 304B stores the cumulative value for transitioning from the state 202 of a given row 302 to a next state by incrementing the number of threads. The column 304C stores the cumulative value for transitioning from the state 202 of a given row 302 to a next state by decrementing the number of threads. There is no cumulative value for column 304C of the row 302A, because the number of threads cannot be decremented to less than one. There is likewise no cumulative value for column 304B of the row 302N, because the number of threads cannot be incremented to greater than the maximum number of threads.

As such, at each training iteration when copying files of a particular discrete file size for a particular file type, the action 204 to take to transition from the current state 202 to a next state 202 is probabilistically selected based on the Q-learning table 300 for the discrete file size in question. Specifically, the action 204 is probabilistically selected from the cumulative values of columns 304A, 304B, and 304C for the row 302 corresponding to the current state 202. In general, the action 204 having the highest cumulative value of any state-action pair for the current state is selected. However, the action 204 is probabilistically selected, which means that there is a random chance that the action 204 will be selected as an action other than that having the highest cumulative value.

For each pair of a discrete file size and a particular file type, files of the discrete file size and for the particular file type are copied over training iterations. At each training iteration, the number of threads to use to copy the files in the next training iteration is selected by selecting an action 204 to transition from the current state 202 (corresponding to the most recently used number of threads) to the next state 202.

The files are then copied using the number of threads corresponding to the next state 202, and the cumulative value for the current (not next) state-selected action pair updated. This process is reiterated until a given state 202 has been stably reached.

Figure 4:
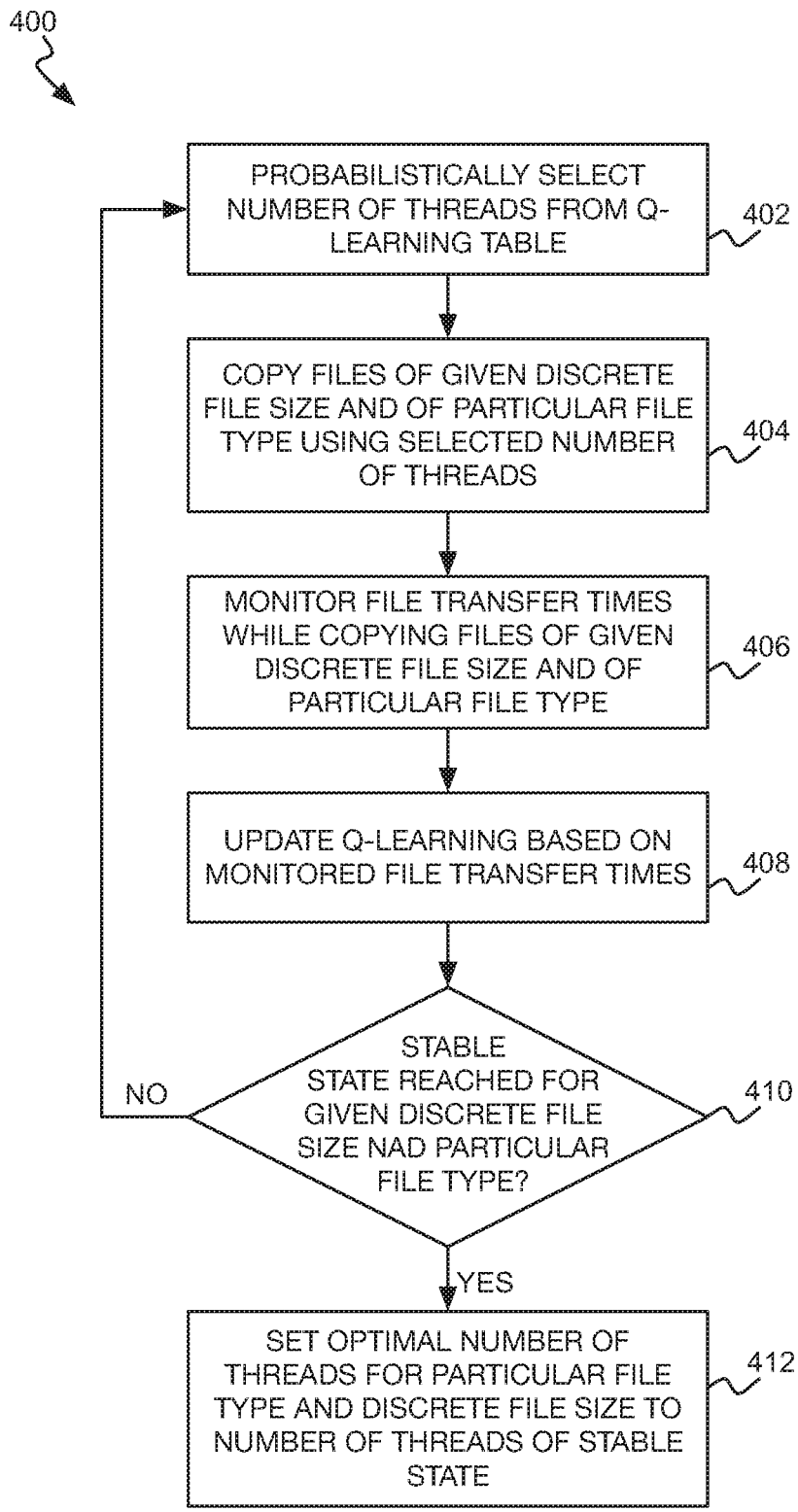
FIG. 4 is a flowchart of an example method for using a Q-learning table of FIG. 3 to determine the optimal number of threads to use to copy files of a particular discrete file size.

FIG. 4 shows an example method 400 for using the Q-learning table 300 to determine the optimal number of threads to use to copy files of a particular discrete file size. The method 400 is performed for each pair of a discrete file size and a particular file type. The training computing system 110 can thus perform the method 400 a number of times equal to the number of different discrete file sizes multiplied by the number of particular file types to realize part 102 of the method 100.

The number of threads to use to copy files of the discrete file size in question and having the particular file type is probabilistically selected from the Q-learning table 300 (402). That is, an action 204 is selected from the state-action pairs corresponding to the current state 202. The current state 202 is the state 202 corresponding to the number of threads most recently used to copy the files of the discrete file size and having the particular file type.

When part 402 is first performed, there is no current state 202, since the files of the discrete file size and having the particular file type have not yet been copied. Therefore, the number of threads may be randomly selected, or set to a default number of threads, such as the default number indicated by a corresponding operating system parameter of the training system. In the next iteration, the current state 202 is thus the state that corresponds to this randomly selected or default number of threads.

When there is a current state 202, an action 204 to transition to a next state 202 is selected from the cumulative values stored in the columns 304A, 304B, and 304C for the row 302 corresponding to the current state 202. This action is probabilistically selected from these state-action pairs. This means that generally the action 204 having the highest cumulative value of any state-action pair for the current state 202 is selected to transition to a next state 202.

However, there is a random chance that an action 204 other than that having the highest cumulative value of any state-action pair for the current state 202 is selected. This is why it is said that the action 204 is probabilistically selected from the state-action pairs in question. The chance that an action 204 may be selected as one other than that having the highest cumulative value of any state-action pair for the current state 202 may decay over time, with increasing iterations of the method 400.

Furthermore, prior to the first iteration through the method 400, the Q-learning table 300 may be reset so that the cumulative value of each column 304A, 304B, and 304C, for every row 302 is set to zero. That is, prior to performing the method 400 for any discrete file size and any particular file type, the cumulative values for taking actions 204 from the states 202 to reach different states 202 have not been determined, and thus can be reset to zero. It is noted that selecting a particular action based on the cumulative value in any unvisited state 202 may be problematic, because the cumulative values for all the state-action pairs will initially be zero. In such situations, one action may be given priority over other actions to avoid any initial condition bias. The cumulative values stored in the columns 304A, 304B, and 304C will then be adjusted as iterations of the method 400 transition from the states 202 corresponding to the rows 302 to different states.

Files of the discrete file size in question and having the particular file type are copied using the selected number of threads (404). For the first iteration, the selected number of threads is the randomly selected or default number of threads, as described. For subsequent iterations, the selected number of threads is the number of threads corresponding to the next state 202. The number of threads corresponding to the next state 202 is equal to the number of threads of the current state 202 after the probabilistically selected action has been taken on this number of threads. For example, if the current state 202 corresponds to eight threads, and the probabilistically selected action is to decrement the number of threads by one, then the next state 202 corresponds to seven threads, and the files of the discrete file size and having the particular file type are copied using seven threads.

The files of the discrete file size in question and having the particular file type may be copied a number of times. That is, in each iteration of part 404, the files may be successively copied over a number of copying processes. In each copying process, the files are copied using the selected number of threads. While the files of the given discrete file size and having the particular file type are copied using the selected number of threads, file transfer time is monitored (406). The file transfer time can be averaged over the number of file copying processes that have been performed.

The Q-learning table 300 is updated based on the monitored file transfer times (408). Specifically, for the row 302 corresponding to the current state 202, the column 304 corresponding to the action 204 that was probabilistically selected to transition from the current state 202 to a next state 202 is updated within the Q-learning table 300. This state-action pair is updated using file copy transfer time as reward reinforcement. Generally, with decreasing file copy transfer time in the next state 202 compared to the current state 202, the cumulative value of the selected action in transitioning from the current state 202 to the next state 202 is increased.

It is noted that the column 304 corresponding to the action 204 that was probabilistically selected is updated for the row 302 corresponding to the current state 202, and not to the next state 204. For instance, the current state 202 may correspond to seven threads. The probabilistically selected action 204 may be to increment the number of threads by one, such that the next state 202 corresponds to eight threads. The files of the discrete file size and having the particular file type are copied using eight threads in part 404, and the file transfer times monitored in part 406. The column 304 of the Q-learning table 300 that is updated in part 408 is the column 304 corresponding to this probabilistically selected action 204 for the current state 202 corresponding to seven threads, and not for the next state 202 corresponding to eight threads.

Mathematically, the cumulative value for the state-action pair of a column 304A, 304B, or 304C for a record 302 can be expressed as $Q(s,a)$ for state $s$ and action $a$. To transition from a current state $s_t$ to a next state $s_{t+1}$, an action $a_t$ is probabilistically selected in part 402 as the action of the column 304A, 304B, or 304C for the record 302 corresponding to the current state $s_t$ having the greatest cumulative value $Q$. Once the action $a_t$ has been thus selected, files of the given discrete file size are copied in part 404, using the number of threads corresponding to the next state $s_{t+1}$ reached by taking the selected action $a_t$ at the current state $s_t$. The file transfer times are monitored in part 406 as the files are copied using this number of threads. The cumulative value $Q(s_t, a_t)$ for the state-action pair including the current state $s_t$ and the selected action $a_t$ is then updated in the column 304A, 304B, or 304C corresponding to the selected action $a_t$ for the record 302 corresponding to the current state $s_t$.

In the Q-learning approach, Q ($s_t$, $a_t$) is expressed as follows, $$Q^{new}(s_t, a_t) \leftarrow (1-\alpha) \cdot Q(s_t, a_t) + \alpha \cdot \left(r_t + \gamma \cdot \max_a Q(s_{t+1}, a)\right).$$

In this expression, $Q^{new}(s_t, a_t)$ is the updated cumulative value that replaces the current value $Q(s_t, a_t)$ in the column 304A, 304B, or 304C corresponding to the selected action $a_t$, for the record 302 corresponding to the current state $s_t$ after the action $a_t$ has been taken. Furthermore, $$\max_a Q(s_{t+1}, a)$$

is an estimate of the optimal future value of the next state $s_{t+1}$ across all possible actions a. That is, $$\max_a Q(s_{t+1}, a)$$

is an estimate the maximum cumulative value of the cumulative values of the column 304A, 304B, and 304C for the record 302 corresponding to next state $s_{t+1}$ that results from taking the selected action $a_t$ at the current state $s_t$).

The expression for Q($s_t$, $a_t$) noted above includes a learning rate parameter $\alpha$ between zero and one, such as 0.2 in one implementation. The learning rate parameter indicates how quickly learning occurs—that is, how quickly the cumulative values Q are updated. Setting the learning rate parameter to zero, for instance, means that the cumulative values Q are never updated, whereas setting the parameter to one means that cumulative values Q are updated most quickly but may fail to reflect critical information during training. The learning rate parameter may decay over subsequent iterations, reflecting increased confidence of the cumulative values over the iterations.

The expression for Q($s_t$, $a_t$) noted above also includes a discount factor parameter $\gamma$ between zero and one (or greater), such as 0.5 in one implementation. The discount factor parameter denotes the importance of future rewards. A discount factor parameter of zero indicates that just current rewards are considered, whereas a discount factor approaching one means that long-time higher rewards may continue to be sought. The discount factor parameter may be increased towards one over multiple iterations to accelerate learning.

As noted above, the action $a_t$ taken to transition from the current state $s_t$ to a next state $s_{t+1}$ is probabilistically selected, which means that there is a chance a random action will be taken regardless of the action that has the maximum cumulative value of any action for the current state. This probabilistic selection is controlled by a parameter $\varepsilon$, which is 0.1 in one implementation. This means that a random action is selected with $\varepsilon$ probability regardless of the actual cumulative values of the actions for the current state. Setting this parameter to zero means that the action having the highest cumulative value is always selected, which can result in a locally but not maximally optimal stable state. The parameter $\varepsilon$ may decay over subsequent iterations to improve stabilization at a current state, however.

The expression for Q($s_t$, $a_t$) noted above includes a reward value $r_t$, which is the reward received when moving from the current state $s_t$ to the next state $s_{t+1}$ by performing action $a_t$. The reward value is based on the monitored file copy, or transfer, times when copying files of the discrete file size with the number of threads corresponding to the next state $s_{t+1}$, such as the average or median monitored file copy, or transfer, time. As such, file copy time (i.e., file transfer time) is used as a feedback reward reinforcement in the Q-learning approach of FIG. 4.

In one implementation, the reward $r_t$ can be expressed as follows.

$$r_t(s_t | a_t) = \begin{cases} \dfrac{k_1 k_2 \cdot g(T_{min} - T_i) f_{nd}}{\sqrt{2\pi\sigma^2}}, & (T_{min} - 2\sigma) \le T_i \le (T_{min} + 2\sigma) \\ k_1(T_{min} - T_i), & \text{otherwise} \end{cases}$$

In this expression $f_{nd}$ is the normal distribution function $$e^{-\frac{(T_i - T_{min})^2}{2\sigma^2}},$$

and indeed, the first term of $r_t$ is similarly a normal distribution. The reward $r_t(s_t|a_t)$ is the reward of performing action $a_t$ at the current state $s_t$. The parameters $k_1$ and $k_2$ are scaling factors for the reward function itself and for the normal distribution function, respectively.

Furthermore, $T_i$ is the monitored file copy or transfer time most recently observed in part 406 in taking the action $a_t$ to transition from the current state $s_t$ to the next state $s_{t+1}$. By comparison, $T_{min}$ is the minimum file copy or transfer time observed thus far in part 406 in any iteration in taking the action $a_t$ to transition from the current state $s_t$ to the next state $s_{t+1}$. The value $\sigma$ is the standard deviation of the distribution, which can be set to a percentage of $T_{min}$, such as 10%. Finally, $g(T_{min} - T_i)$ can be set to positive one (+1) if $T_{min}$ is greater than or equal to $T_i$, and to negative one (−1) if $T_{min}$ is less than $T_i$.

Still referring to FIG. 4, once the Q-learning table 300 has been updated in part 408, if a stable state has not yet been reached in the current iteration (410), then the method 400 is repeated with another iteration at part 402, with the current state $s_t$ being set to the next state $s_{t+1}$. Whether a stable state has been reached can be determined in a number of different ways. For example, if in a predetermined number of most iterations the next state $s_{t+1}$ is equal to the current state $s_t$ more than (1−$\varepsilon$) percent of the time, then it may be deemed that a stable state has been reached. As another example, it may be deemed that a stable state has been reached if in a predetermined number of most iterations in which a random action was selected, the next iteration results in reversion to the prior (i.e., stable) state, unless frequent visit to that state continues to provide a better reward.

Once a stable state has been reached (410), then the method 400 concludes with setting the optimal number of threads for the combination of the particular file type and the discrete file size in question to the number of threads corresponding to the stable state (412). In the method 400, then, a Q-learning approach, as one type of temporal difference learning, machine learning approach, is used to determine the optimal number of threads for copying files of a particular discrete file size. For each particular file type, the method 400 is repeated for each of a number of particular discrete file sizes, yielding a set of data points for each file type, with each data point corresponding to the determined optimal number of threads for a specific discrete file size and a particular file type.

As noted above in relation to part 104 of the method 100, once the optimal numbers of threads have been determined for the discrete file sizes for a particular file type, a continuous function for each file type is fit onto the resulting set of data points corresponding to the file type. This permits the optimal number of threads to be computed for files of any file size and that have a file type to which a continuous function has been determined. Each continuous function may be a polynomial function. As such, polynomial regression or interpolation may be employed to fit a continuous function onto the set of data points corresponding to a particular file type. The cutoff for the polynomial function can also be recorded, which is the minimum file size for which the optimal thread count is one. The polynomial function is thus evaluated for file sizes beyond this point. The function will output one if the input file size is greater than the cutoff.

As noted above, the method 400 is repeated for each combination of a file type and a discrete file size. That is, for each file type, there may be a number of different discrete file sizes. Therefore, if there are X file types and Y discrete file sizes for each file type, then the method 400 is performed X*Y times. Once the method 400 has been repeatedly performed in this manner, there is a set of Y data points for each of the X file types, such that X continuous functions corresponding to the X file types are generated.

Figure 5:
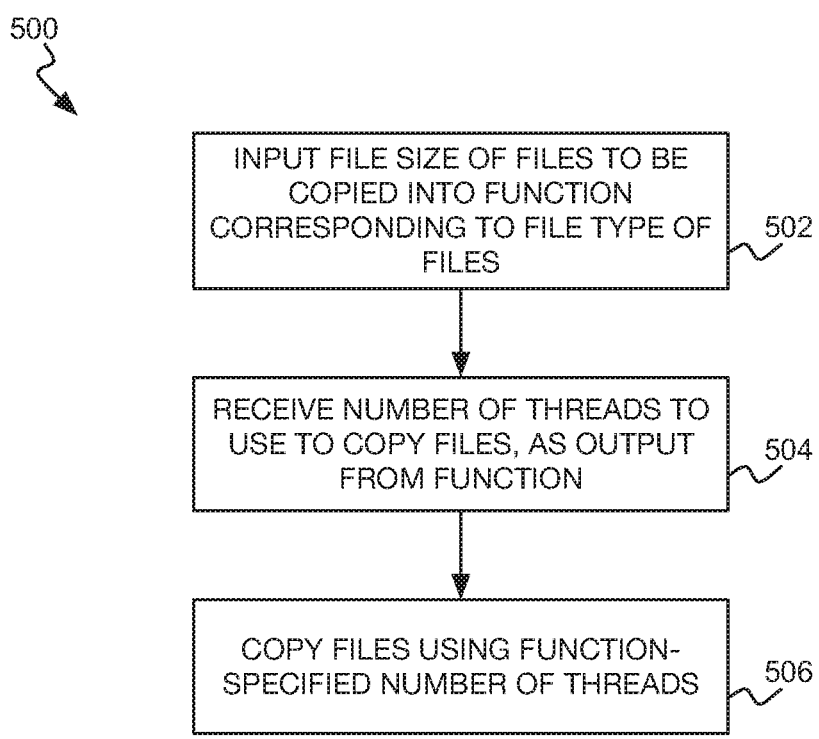
FIG. 5 is a flowchart of an example method for using a continuous function determined in the method of FIG. 1 or FIG. 4 to copy a file.

FIG. 5 shows an example method 500 for using the continuous functions determined in the method 100 to copy files. The method 500 can be performed at the production computing system 112 to realize part 106 of the method 100. As such, after the method 400 has been performed at the training computing system 110 to realize part 102 of the method 100, the continuous functions are fit onto the resulting sets of data points. The continuous functions may be fit at the training computing system 110 as well, in which case the continuous functions are provided to the production computing system 112 to utilize to perform the method 500.

The file size of the files to be copied is input into the continuous function corresponding to the file type of files (502), and the output of this function is received, as the number of threads to use to copy the files (504). As noted above, the continuous function provides a rational number that may not be an integer. Because the number of threads has to be an integer, the output of the continuous function may be rounded or truncated to yield the number of threads. The set of files in question is then copied using the function-specified number of threads (506).

Figure 6:
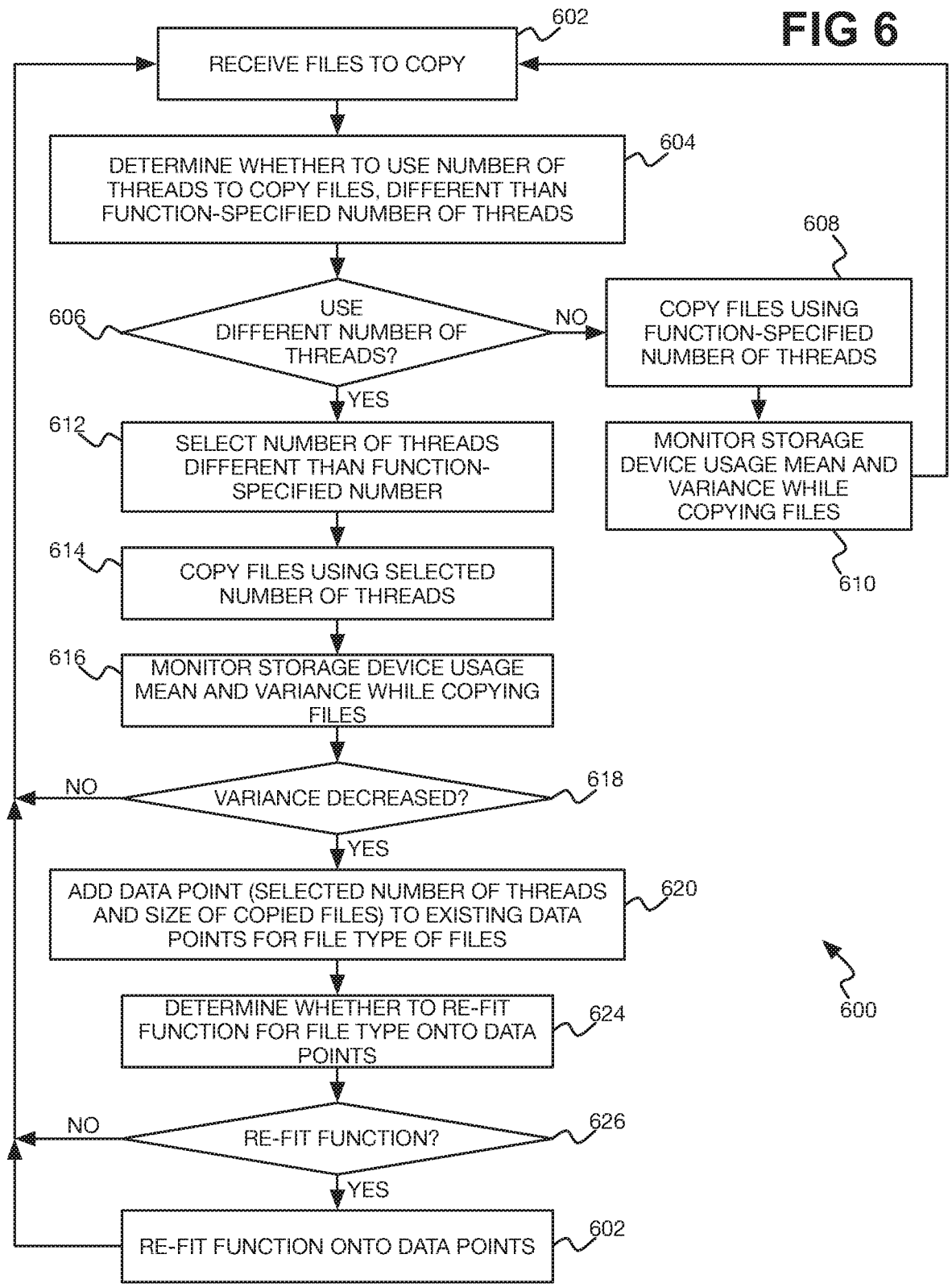
FIG. 6 is a flowchart of an example method for using and updating the continuous function determined in the method of FIG. 1 or FIG. 4.

FIG. 6 shows an example method 600 for using and periodically updating a continuous function in the method 100. Whereas the method 500 depicts how the continuous function can be used to copy the files, by specifically using the function corresponding to the files' file type to determine the number of optimal threads that a process should spawn in copying the files, the method 600 also provides for periodically updating this function. The production computing system 112 can thus perform the method 600 to realize both parts 106 and 108 of the method 100.

The production computing system 112 receives files to be copied (602), and determines whether to use a number of threads to copy the files different than the function-specified number of threads (604). For instance, a parameter may be set indicating the probability or chance that the function-specified number of threads will not be used to copy the files. The parameter may be set to 0.05, as one example, indicating that each time a file is to be copied, there is a 5% chance that the file will be copied by using a number of threads other than that specified by the function corresponding to the files' file type for the file size of the files in question.

If the production computing system 112 determines that the files are to be copied using the function-specified number of threads (606), then the files are copied using the number of threads specified by the continuous function for the file type of the files (608). For instance, the method 500 can be performed to implement part 608. However, while the files are being copied, the storage device utilization mean and variance are monitored (610). The storage device utilization mean and variance are described in more detail below. The method 600 is then repeated at part 602 the next time a set of files have to be copied.

If the production computing system 112 determines that the files have to be copied using a number of threads other than that specified by the continuous function corresponding to the files' file type (606), then the number of threads to use to actually copy the files (i.e., different than the function-specified number) is selected (612). For instance, the function for the file type of the files may be employed to first determine the number of threads to use to copy the files. Rather than use this number of threads, the production computing system 112 may instead select a number of threads that is one more or one less than the function-specified number of threads. There may be an equal probability as to whether the function-specified number of threads minus one or whether the function-specified number of threads plus one is selected.

The files are copied using the selected number of threads different than the continuous function-specified number of threads (614), and the storage device utilization mean and variance again monitored (616). The storage device utilization mean and variance are used as a type of feedback variable to determine whether a selected number of threads different than the continuous function-specified number of threads is more optimal than the function-specified number of threads. The continuous function predicts the optimal number of threads based on the data points determined at a particular point in time at the training computing system 110 for files of discrete file sizes. However, the production computing system 112 may vary in its constituent hardware components as compared to the training computing system 110, and even if the systems 110 and 112 are the same system, over time the continuous function may decrease in accuracy at predicting the optimal number of threads to use.

While file copy time is used as feedback reinforcement to determine the original set of data points onto which the continuous function is fit, file copy time may not be able to be used as feedback reinforcement to subsequently update the function. This is because files that are copied in a production setting—as opposed in a training setting to just generate the original set of data points—have varying file sizes, and the likelihood that many files of the same discrete file size are copied is low over any given length of time. Therefore, storage device utilization is instead employed for feedback reinforcement, because such utilization is meaningful for files of different sizes.

Each time files are copied in part 608 or 614, the storage device mean and variance is monitored, or determined, in part 610 or 616, respectively. The variance may be specified by the expression $$v_i = \frac{\sum (t_i - \mu)^2}{N},$$

where i is a time instance and $t_i$ is the throughput at time instance i. The value μ is the mean of the throughput (i.e., the storage device mean) over all iterations i in which files have been copied by performing the method 600, whereas N is the total number of samples (viz., disk utilization at each time instance i) that have been recorded.

If, after the files are copied using a number of threads different than the function-specified number of threads in part 614, the storage device usage variance monitored in part 616 does not decrease (618), then the method 600 is repeated at part 602 the next time files of the same file type have to be copied. That is, if the storage device variance $v_i$ for copying the current set of files having a given file type is not less than the variance $v_{i-1}$ when the previous set of files of this same given file type was copied, then the method 600 is repeated at part 602. In one implementation, if $(v_i-v_{i-1})$ <thresh then the method 600 is repeated at part 602, where thresh can be an above-zero threshold. This means that so long as the variance does not decrease by more than the threshold, the method 600 is repeated at part 602.

However, if storage device usage variance does decrease (618), then a data point is added to the existing set of data points for the file type in question (620). The existing set of data points is the original set of data points determined in part 102 of the method 100 and on which basis the continuous function for the file type of the files that were copied in part 614 was determined, along with any other data points that have been added in prior iterations of part 618 for files of this file type. The data point that is added in part 618 is the number of threads (different than the function-specified number of threads) used in part 614 to copy the files, for the file size of this file. It is noted that the production computing system 112 thus receives the original set of data points for each file type from the training computing system 110 so that the system 112 can later supplement the data points set and ultimately update the continuous functions based on the supplemented sets.

When a data point is added to the set of data points for a given file type, the production computing system 112 determines whether the continuous function corresponding to this file type should be re-fit onto the newly updated data points set (622). For example, a continuous function may be re-fit periodically, such as once a predetermined number of data points have been added to the set of data points for the file type to which the function corresponds since the last time the function was re-fit (or since the time the function was first fit onto the original set of data points for this file type). If the continuous function for the file type in question is not to be re-fit onto the updated set of data points (624), then the method 600 is repeated at part 602 the next time files are to be copied.

However, if the continuous function for the file type is to be re-fit onto the updated set of data points (624), then the production computing system 112 re-fits the function (626). The production computing system 112 can fit a continuous function onto the updated set of data points for the file type in the same manner as the training computing system 110 initially fit the function onto the original set of data points for the file type in part 104. By adding data points reflecting file copying that was performed at the production computing system 112 itself—as opposed to at the training computing system 110—the function for the file type is thus adapted to the production computing system 112, and further to the conditions (i.e., the context) of the system 112 as they vary over time.

The function adaptation described in relation to the method 600 thus leverages the usage of a feedback variable—storage device utilization variance and mean—that can be realistically employed in the production computing system 112. File copy time, which is used for feedback reinforcement at the training computing system 110 in part 102, is not practically usable at the production computing system 112, because files that will be copied in a production environment in all likelihood will vary in file size. By comparison, in part 102, training files of particular discrete file sizes can be employed for each file type. However, storage device utilization mean and variance are meaningful across files of different file sizes for the same file type, and thus can be used to determine whether to add new data points to the existing set of data points for this file type in the method 600.

In the temporal difference learning, machine-learning techniques that have been described, for each file type, the optimal numbers of threads to use to copy files of different discrete file sizes are determined by using just file copy time as an input parameter (i.e., for reward reinforcement). That is, other factors, such as the number of processors and other attributes of the training computing system 110, as well as attributes of the source and/or target storage device, are not explicitly considered as input parameters in these techniques; as these parameters indirectly affect an agent's performance, the agent will learn from its experience to find the optimal thread count. Furthermore, for each file type, a continuous function is fitted onto the optimal numbers of threads that have been determined. Each continuous function can be subsequently updated by taking into account just storage device utilization mean and variance (specifically as a reward variable). Other factors are similarly not explicitly considered as input parameters when determining whether a new data point should be added, on which basis a continuous functions is then updated.

Figure 7:
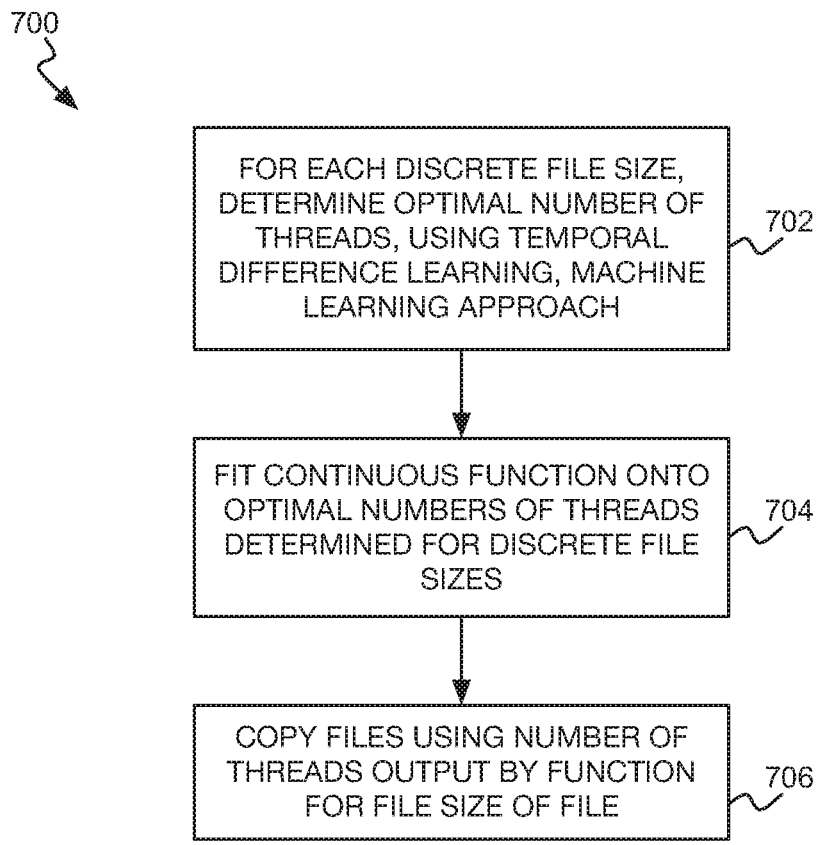
FIG. 7 is a flowchart of an example method.

FIG. 7 shows an example method 700. The method 700 can be performed by one or more computing systems. For instance, parts 702 and 704 may be performed by the training computing system 110, whereas part 706 may be performed by the production computing system 112. The method 700 can be performed for each file type of a number of different file types.

For each of a number of discrete file sizes, the optimal number of threads to copy files of the discrete file size in question is determined using a temporal difference learning, machine learning approach (702), as has been described. A continuous function is then fitted onto the determined numbers of threads for the discrete file sizes (704). A set of file can thus be copied using the number of threads output by the function for the file size of the file (706).

Figure 8:
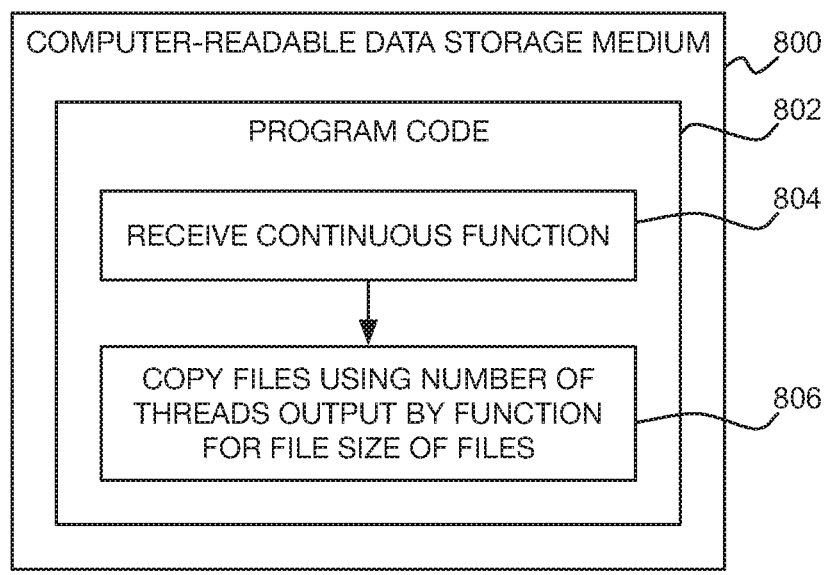
FIG. 8 is a diagram of an example computer-readable data storage medium.

FIG. 8 shows an example non-transitory computer-readable data storage medium 800. The computer-readable data storage medium 800 stores program code 802 that is executed by a computing system to perform processing. For instance, the production computing system 112 may perform the processing. The processing can also be performed for each file type of a number of different file types.

The processing includes receiving a continuous function that has been fitted onto determined optimal numbers of threads to use to copy files of discrete file sizes (804). In one implementation, part 804 may include receiving the optimal numbers of threads for the discrete file sizes, as a set of data points. The continuous function may then be generated at the computing system executing the program code 802—e.g., such as by the computing system 112, in lieu of by the training computing system 110. The processing includes copying a file using the number of threads output by the function for the file size of the file (806).

FIG. 9 shows an example computing system 900. The computing system 900 includes a memory 902 and a processor 904. The memory 902 stores a Q-learning table 906, such as the Q-learning table 300 of FIG. 3. The Q-learning table 906 stores cumulative values for state-action pairs. Each state-action pair includes one of a number of states and one of a number of actions. The states correspond to different numbers of threads, whereas the actions include incrementing the number of threads, decrementing the number of threads, and maintaining the number of threads. The memory 902 can store a Q-learning table 906 for each file type of a number of different file types.

The processor 904 performs parts 908, 916, and 918 for each file type. Specifically, the processor 904, for each of a number of different discrete file sizes, determines an optimal number of threads to use to copy files of the discrete file size by iteratively performing the following processing until a stable state has been reached (908). The processing includes probabilistically selecting an action to transition from a current state to a next state, using the Q-learning table 906 (910). The action is probabilistically selected based on the action, of the state-action pair including the current state, which has the highest cumulative value within the table 906. The processing includes copying files of the discrete size in question using the selected number of threads, and monitoring file transfer (i.e., copy) times (912). The processing includes updating the Q-learning table 906 (914). Specifically, the cumulative value for the state-action pair corresponding to the current state and the selected action is updated based on a reward value taking into account the monitored file transfer times.

The processor 902 thus sets the optimal number of threads for each discrete file size to the number of threads corresponding to the stable state that has been reached (916). The processor 902 fits a continuous function onto the determined optimal numbers of threads for the discrete file sizes (918). The continuous function of a particular file type outputs the number of threads to use to copy files of any input file size that have this file type, and thus can be used when to determine the number of threads that should be employed when files of the particular file type are subsequently copied.

The techniques that have been described provide for a temporal difference learning, reinforcement learning approach to determine the optimal number of threads to use to copy files. In one implementation, the approach can be a Q-learning approach. For a given file type, once a continuous function has been fit onto the optimal numbers of threads for various discrete file sizes, the function can be periodically updated to adapt to a production computing system different than a training computing system on which the optimal numbers of threads for various discrete file sizes were originally determined. Periodically updating the continuous function also ensures that the function can reflect changing conditions of the production computing system.

I claim:
1. A method comprising:
   determining a continuous function specific to a given file type and that outputs a number of threads to use to copy an input file of any input file size that has the given file type, the continuous function calculating the number of threads to use to copy the input file based on a file size of the input file, wherein determining the continuous function comprising:
   for each respective discrete file size of a plurality of discrete file sizes that are each a specific different file size, determining, without using the continuous function, an optimal number of threads to use to copy files of the respective discrete file size and having the given file type, using a temporal difference learning, reinforcement learning approach in which file copy time is used as feedback reward reinforcement, wherein
   the temporal difference learning, reinforcement learning approach uses a plurality of states respectively corresponding to a plurality of different numbers of threads to use to copy the files,
   the optimal number of threads for each respective discrete file size is determined by performing a plurality of training iterations, and
   in each training iteration, an action is taken to transition from a current state to a next state, and the files of each respective discrete file size are copied using a number of threads of the next state; and
   determining the continuous function based on the optimal number of threads to use for each respective discrete file size, by performing continuous function fitting on the optimal number of threads determined for each respective discrete file size, yielding the continuous function;
   after determining the continuous function, for a particular file to be copied that has the given file type and regardless of whether the particular file has a file size that is one of the plurality of discrete file sizes, inputting the file size of the particular file to the continuous function and receiving as output from the continuous function a number of threads to use to copy the particular file; and
   copying the particular file using the number of threads output by the continuous function.

2. The method of claim 1,
   wherein, in each iteration, the action is selected from incrementing a number of threads of the current state, decrementing the number of threads of the current state, or maintaining the number of threads of the current state.

3. The method of claim 2, wherein the temporal difference learning, reinforcement learning machine approach is a Q-learning approach,
   wherein for each respective discrete file size, a Q-learning table is maintained of cumulative values for a plurality of state-action pairs,
   wherein in each training iteration, the file copy time to copy the files of the respective discrete file size using the number of threads of the next state transitioned to from the current state by taking the selected action is monitored,
   and wherein after each training iteration a cumulative value for a state-action pair corresponding to the current state and the selected action is updated.

4. The method of claim 3, wherein in each training iteration, the action to transition from the current state to the next state is probabilistically selected based on a state of the state-action pair having a highest cumulative value of any state-action pair including the current state,
   and wherein after each training iteration, the cumulative value for the state-action pair corresponding to the current state and the selected action are updated based on a reward value taking into account a monitored file copy time to copy the files of the respective discrete file size.

5. The method of claim 2, wherein for each respective discrete file size, after each training iteration, another training iteration is performed responsive to determining that a stable state has not yet been reached,
wherein, for each respective discrete file size, responsive to reaching the stable state, the optimal number of threads for the respective discrete file size is set to the number of threads of the stable state.

6. The method of claim 1, wherein the continuous function is a polynomial function and the continuous function fitting comprises polynomial regression or interpolation.

7. The method of claim 1, wherein the optimal number of threads to use for each respective discrete file size is determined and the continuous function is fitted at a training system, and the particular file is copied using the optimal number of threads output by the continuous function corresponding to the given file type for the file size of the particular file at a production system.

8. The method of claim 1, wherein the particular file copied is one of a plurality of particular files of varying file sizes that are copied using numbers of threads output by the continuous function for the varying file sizes, and as the plurality of particular files are each copied, storage device usage variance and mean are monitored.

9. The method of claim 8, wherein a set of data points corresponds to the given file type and comprises the optimal numbers of threads determined for each respective discrete file size of the plurality of discrete file sizes,
wherein periodically a plurality of additional files of the given file type is copied using a selected number of threads different than a number of threads output by the continuous function for a file size of the plurality of additional files,
wherein responsive to the storage device usage variance decreasing after copying the plurality of additional files using the selected number of threads different than the number of threads output by the continuous function for the file size of the plurality of additional files corresponding to the given file type, the selected number of threads and the file size of the plurality of additional files are added as a new data point to the set of data points corresponding to the given file type,
wherein the new data point is one of a plurality of new data points added to the set of data points,
and wherein periodically the continuous function corresponding to the given file type is updated by refitting the continuous function onto the set of data points including the plurality of new data points.

10. The method of claim 1, wherein, for each respective discrete file size, the optimal number of threads to use to copy the files having the given file type and of the respective discrete file size is determined using just the file copy time and the respective discrete file size as input parameters to the temporal difference learning, reinforcement learning approach.

11. A non-transitory computer-readable data storage medium storing program code executable by a processor to perform processing comprising:
receiving a continuous function specific to a file type, the continuous function outputting a number of threads to use to copy an input file of any input file size that has the file type, the continuous function calculating the number of threads to use to copy the input file based on a file size of the input file, the continuous function determined by performing continuous function fitting on optimal numbers of threads used to copy files having the file type and of respective discrete file sizes that are each a specific different file size, the optimal numbers of threads determined without using the continuous function via a temporal difference learning, reinforcement learning approach in which file copy time is used as feedback reward reinforcement, wherein
the temporal difference learning, reinforcement learning approach uses a plurality of states respectively corresponding to a plurality of different numbers of threads to use to copy the files,
the optimal numbers of threads for each respective discrete file size is determined by performing a plurality of training iterations, and
in each training iteration, an action is taken to transition from a current state to a next state, and the files of each respective discrete size are copied using a number of threads of the next state;
after receiving the continuous function, for a particular file to be copied that has the file type and regardless of whether the particular file has a file size that is one of the respective discrete file sizes, inputting the file size of the particular file to the continuous function and receiving as output from the continuous function a number of threads to use to copy the particular file; and
copying the particular file using the number of threads output by the continuous function.

12. The non-transitory computer-readable data storage medium of claim 11, wherein the optimal numbers of threads for the respective discrete file sizes are received as a set of data points for the file type.

13. The non-transitory computer-readable data storage medium of claim 12, wherein the particular file is one of a plurality of particular files of varying file sizes that are copied using numbers of threads output by the continuous function for the varying file sizes, the processing further comprising:
as the plurality of particular files are copied, monitoring storage device usage mean and variance.

14. The non-transitory computer-readable data storage medium of claim 13, wherein the processing further comprises:
periodically copying a plurality of given files using a selected number of threads different than a number of threads output by the continuous function for a file size of the plurality of given files, the plurality of given files having the file type to which the continuous function corresponds; and
responsive to the storage device usage mean and variance decreasing after copying the plurality of given files using the selected number of threads different than the number of threads output by the continuous function for the file size of the plurality of given files, adding the selected number of threads for the file size of the plurality of given files as a new data point to the set of data points for the file type.

15. The non-transitory computer-readable data storage medium of claim 14, wherein the new data point is one of a plurality of new data points added to the set of data points for the file type,
and wherein each new data point comprises a number of threads for a particular file size different than a number of threads output by the continuous function for the particular file size and that resulted in a decrease in the storage device usage mean and variance after copying files of the particular file size and having the file type, the processing further comprising:
periodically updating the continuous function corresponding to the file type by fitting the continuous function onto the set of data points for the file type including the plurality of new data points.

16. The non-transitory computer-readable data storage medium of claim 12, wherein receiving the continuous function comprises generating the continuous function.

17. The non-transitory computer-readable data storage medium of claim 11, wherein the processor is part of a production computing system, and wherein the optimal numbers of threads for the respective discrete file sizes were determined at a training computing system different than the production computing system.

18. A computing system comprising:
a memory storing a Q-learning table of cumulative values for a plurality of state-action pairs, the Q-learning table corresponding to a given file type, each state-action pair comprising one of a plurality of states and one of a plurality of actions, the plurality of states corresponding to different numbers of threads, the plurality of actions comprising incrementing a number of threads, decrementing the number of threads, and maintaining the number of threads; and
a processor configured to determine a continuous function that is specific to the given file type and that outputs a number of threads to use to copy an input file of any input file size that has the given file type, the continuous function calculating the number of threads to use to copy the input file based on a file size of the input file, wherein the continuous function is determined by:
for each respective discrete file size of a plurality of discrete file sizes that are each a specific different file size, determining, without using the continuous function, an optimal number of threads to use to copy files of the respective discrete file size that have the given file type, by iteratively performing, until a stable state has been reached:
probabilistically selecting an action to transition from a current state to a next state using the Q-learning table, the action probabilistically selected based on the action of the state-action pair including the current state for which the Q-learning table has a highest cumulative value;
copying the files of the respective discrete file size using the number of threads of the next state and monitoring file transfer times to copy the files;
updating, within the Q-learning table, a cumulative value for a state-action pair corresponding to the current state and the probabilistically selected action based on a reward value taking into account the monitored file transfer times;
for each respective discrete file size, setting the optimal number of threads for the respective discrete file size to the number of threads corresponding to the stable state that has been reached for the respective discrete file size; and
determine the continuous function based on the optimal number of threads to use for each respective discrete file size, by performing continuous function fitting on a set of data points corresponding to the given file type and that comprises the optimal numbers of threads determined for each respective discrete file size of the plurality of discrete file sizes, yielding the continuous function.

19. The computing system of claim 18, wherein the processor is further configured to:
after determining the continuous function, for a particular file to be copied that has the given file type and regardless of whether the particular file has a file size that is one of the plurality of discrete file sizes, inputting the file size of the particular file to the continuous function and receiving as output from the continuous function a number of threads to use to copy the particular file; and
copying the particular file using the number of threads output by the continuous function,
wherein the particular file copied is one of a plurality of particular files of varying file sizes that are copied using numbers of threads output by the continuous function for the varying file sizes, and as the plurality of particular files are each copied, storage device usage variance and mean are monitored,
wherein periodically a plurality of additional files of the given file type is copied using a selected number of threads different than a number of threads output by the continuous function for a file size of the plurality of additional files,
wherein responsive to the storage device usage variance decreasing after copying the plurality of additional files using the selected number of threads different than the number of threads output by the continuous function for the file size of the plurality of additional files corresponding to the given file type, the selected number of threads and the file size of the plurality of additional files are added as a new data point to the set of data points corresponding to the given file type,
wherein the new data point is one of a plurality of new data points added to the set of data points,
and wherein periodically the continuous function corresponding to the given file type is updated by refitting the continuous function onto the set of data points including the new data points.

20. The computing system of claim 19, wherein the continuous function is a polynomial function and the continuous function fitting comprises polynomial regression or interpolation.

* * * * *